United States Patent [19]
Myers, Jr.

[11] Patent Number: 6,023,625
[45] Date of Patent: *Feb. 8, 2000

[54] SYSTEM AND METHOD FOR REDUCING MULTICAST INTERFERENCE IN A DISTRIBUTED ANTENNA NETWORK

[75] Inventor: Thomas C. Myers, Jr., Columbus, Ga.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/801,642

[22] Filed: Feb. 18, 1997

[51] Int. Cl.$^7$ ...................................................... H04Q 7/36
[52] U.S. Cl. ............................ 455/503; 455/63; 455/446; 455/562
[58] Field of Search .................................. 455/422, 446, 455/501, 503, 63, 67.3, 67.6, 59, 507, 561, 562, 502, 504

[56] References Cited

U.S. PATENT DOCUMENTS

| | | |
|---|---|---|
| 4,916,460 | 4/1990 | Powell . |
| 4,932,049 | 6/1990 | Lee . |
| 5,179,722 | 1/1993 | Gunmar et al. .......................... 455/67.3 |
| 5,218,717 | 6/1993 | Reitberger ................................ 455/503 |
| 5,230,082 | 7/1993 | Ghisler et al. . |
| 5,381,459 | 1/1995 | Lappington . |
| 5,428,818 | 6/1995 | Meidan et al. ............................. 455/63 |
| 5,504,936 | 4/1996 | Lee .......................................... 455/562 |
| 5,603,083 | 2/1997 | Lee .......................................... 455/562 |
| 5,708,969 | 1/1998 | Kotzin et al. .............................. 455/63 |
| 5,715,519 | 2/1998 | Saeki et al. ................................ 455/63 |
| 5,787,352 | 7/1998 | Benveniste ............................... 455/446 |

FOREIGN PATENT DOCUMENTS

| | | |
|---|---|---|
| 2 300 549 | 11/1996 | United Kingdom . |
| WO9506365 | 3/1995 | WIPO . |
| WO9638014 | 11/1996 | WIPO . |

OTHER PUBLICATIONS

"Cable in PCS: Pioneering telephony's future technology", Andrew Morris, Communications Technology, Dec. 1994, pp. 42–49.

"PCS over cable—an opportunity for some CATV companies", Harry E. Young, Telephony, Jan. 30, 1995, pp. 70–72.

"CATV Return Path Characterization for Reliable Communications", Eldering et al., IEEE Communications Magazine, Aug. 1995, pp. 62–69.

*Primary Examiner*—Edward F. Urban
*Assistant Examiner*—Thuan T. Nguyen
*Attorney, Agent, or Firm*—Burns, Doane, Swecker & Mathis, L.L.P.

[57] ABSTRACT

A distributed antenna network for reducing multicast interference between multicast cells. More particularly, a system and method are provided for calculating multicast interference zones between the multicast cells and configuring coverage areas to encompass the multicast interference zones. This multicast cell configuration avoids the need for delay time adjusting techniques for equalizing the transmission paths and reduces multicast interference by effectively shifting the multicast interference zones.

10 Claims, 9 Drawing Sheets

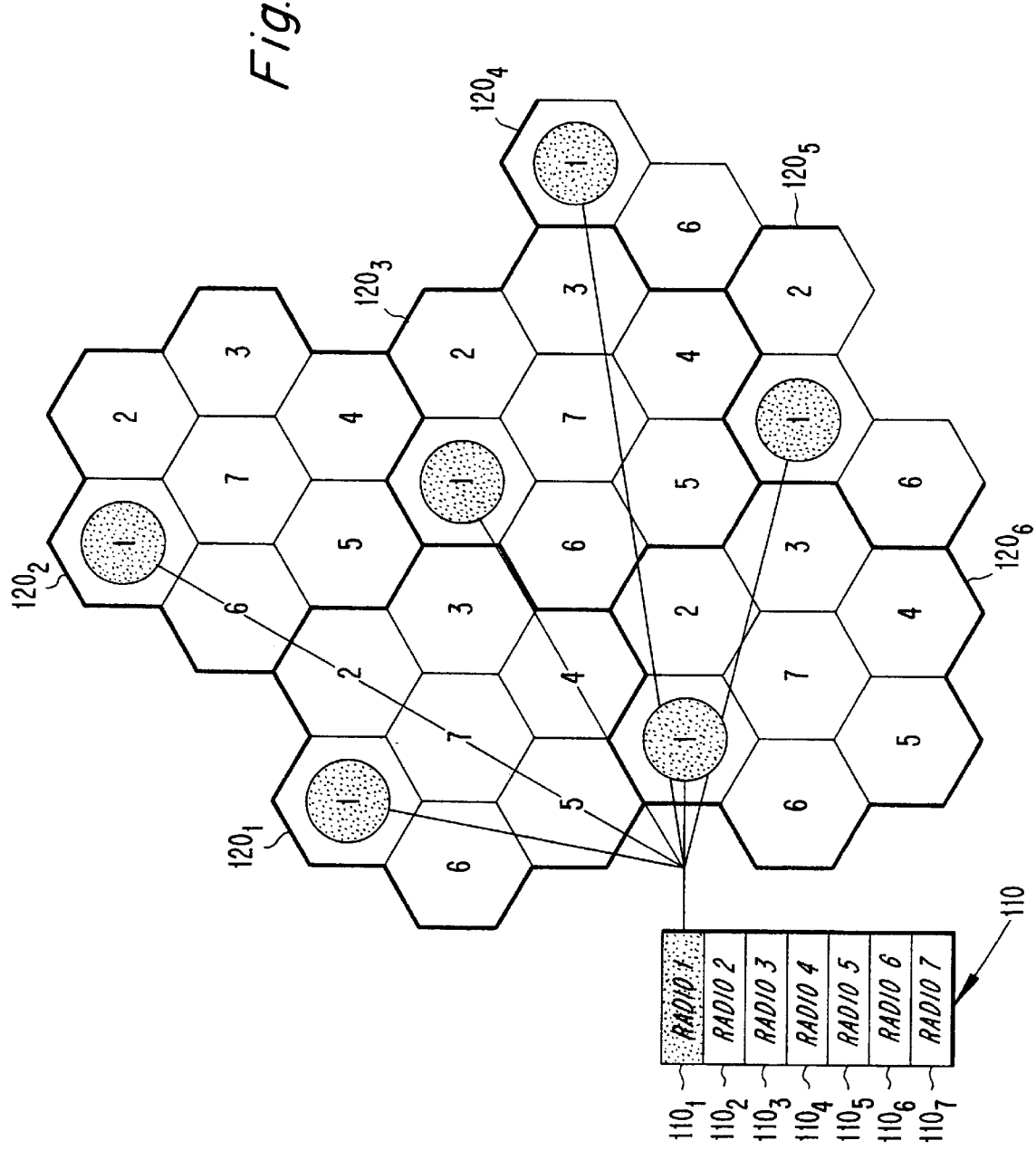

6,023,625

SYSTEM AND METHOD FOR REDUCING MULTICAST INTERFERENCE IN A DISTRIBUTED ANTENNA NETWORK

FIELD OF THE INVENTION

The present invention is directed to a system and method for reducing multicast interference in distributed antenna networks. More particularly, the present invention is directed to a system and method of providing multicast coverage via a distributed antenna network while avoiding the multicast interference normally encountered in such systems.

BACKGROUND OF THE INVENTION

In the ongoing development of communications services, new systems and techniques such as distributed antenna networks are being investigated. In a distributed antenna network, wireless communication is provided from a central location using multiple remote antenna units. One known type of a distributed antenna network is a multicast network, an example of which is illustrated in FIG. 1 where a network coverage area includes multicast cells $20_1, 20_2, \ldots 20_n$ and smaller multicast subcells $25_1, 25_2, 25_3, \ldots 25_z$. Each subcell is served by a remote antenna unit $21_1, 21_2, 21_3, \ldots 21_z$. The remote antenna units are each connected to one of a plurality of transceivers $10_1, 10_2, 10_3, \ldots 10_n$ contained in a transceiver unit 10. Each transceiver operates on a different frequency or set of frequencies. The transceivers $10_1, 10_2, 10_3, \ldots 10_n$ are respectively connected to one or more of the remote antenna units $21_1, 21_2, 21_3, \ldots 21_z$. Each multicast cell is served by a single transceiver, and each subcell is served by a single antenna unit. All of the subcells within a cell are served by the same transceiver, and thus the same frequency or frequency set. Since each transceiver can serve multiple multicast subcells, multicasting allows each transceiver $10_1, 10_2, 10_3, \ldots 10_n$ to cover a larger geographic area 20 than normally provided by a single antenna unit.

Mobile communication systems are known or under development which are capable of providing high quality signals at lower costs than traditional cellular infrastructures. For example, communication networks presently exist which have been designed from cable television (CATV) infrastructures. One particular system uses a hybrid fiber/coax (HFC) CATV infrastructure to increase communication capacity and improve service quality. Although it is theoretically possible for any CATV infrastructure to support a mobile communication network, the HFC cable infrastructure is considered to be an economical alternative to wireless providers seeking to avoid the high cost of network construction.

FIG. 2 illustrates the basic components of a CATV infrastructure used to support wireless communications. In FIG. 2, base stations $50_1$ and $50_2$ are connected to a public network such as a public switched telephone network. Remote antenna signal processors RASP1 $52_1$ and RASP2 $52_2$ connect the base stations $50_1$ and $50_2$ to a fiber equipment 54. The fiber equipment 54 is connected to a fiber node 58 by fiber optic cable 56 and the fiber node 58 is connected to remote antenna driver (RAD) nodes $62_1$ and $62_2$ by two-way coaxial cable 60. The RAD nodes $62_1$ and $62_2$ each include a group of RADs $64_1$ and $64_2$ and $66_1$ and $66_2$, respectively, connected to antennas $68_1, 68_2, 70_1$ and $70_2$, respectively. Each RASP converts radio frequency signals into CATV frequency signals for transmission over the CATV system and each RAD converts CATV frequency signals back into radio frequency signals. More specifically, the RASPs $52_1$ and $52_2$ convert the radio frequency signals from the base stations $50_1$ and $50_2$ and then transmit the converted signals in the downlink path toward fiber node 58 and coaxial cable 60. It should be appreciated that RADs and RASPs are sometimes referred to as cable microcell integrators (CMIs).

The RADs $64_1, 64_2, 66_1$, and $66_2$ receive radio frequency signals and convert these signals into CATV signals suitable for uplink transmission in the CATV system. The RASPs $52_1$ and $52_2$ convert the upstream CATV frequency signals back into radio frequency signals for processing by base stations $50_1$ and $50_2$. This CATV infrastructure also may accommodate equipment for multiple modulation schemes, such as time division multiple access (TDMA), code division multiple access (CDMA) and frequency division multiple access (FDMA).

In distributed antenna networks where wireless communication service is provided from a centralized location using remote antenna units, the multiple remote antenna units are tuned to the same transmit and same receive carrier frequencies to create multicast cells. Because all remote antenna units in a multicast cell are connected to the same radio transceiver unit, time delays can occur due to the variations in the lengths of the transmission paths and/or types of transmission media connecting the remote antenna units.

FIG. 3 illustrates the problems associated with transmission time delay for a variety of transmission paths in a distributed antenna network. In this example, remote antenna units $21_1, 21_2, 21_3$, and $21_4$ operate on the same radio frequency but in different multicast subcells. These antenna units are connected with a transmission media interface 32 by transmission paths $31_1, 31_2, 31_3$, and $31_4$, respectively. A transceiver unit 10 connected to media interface 32 communicates with a mobile unit 35 over this network. Each of these transmission paths $31_1, 31_2, 31_3$, and $31_4$ has a different length, resulting in different delay times for transmitted signals. If the transmission paths are similar in length so that the signals are received at the transceiver unit 10 within a certain time window, the transceiver 10 can compensate for the time delay by using an equalizer. However, if the lengths of the transmission paths are sufficiently different, identical signals transmitted over different transmission paths will arrive at the transceiver 10 with delay differences greater than the acceptable time window, and multicast interference will occur. The degree of multicast interference depends on numerous factors, but is influenced greatly by delay differences due to the various lengths of the transmission paths and signal strength differences between the different paths. The communication problems caused by multicast interference are identical to intersymbol interference experienced in conventional radio communication systems; however, the source of multicast interference is different from that of normal cellular intersymbol interference. Existing solutions do not adequately reduce multicast interference.

FIGS. 4(a)–4(c) illustrate the equalizing of signals received by a transceiver equalizer at various times due to different length transmission paths. In FIGS. 4(a)–4(c), a differential delay time $\Delta t$ represents the time difference between signals received at a transceiver over two different transmission paths. In FIG. 4(a), remote antenna units $21_1$ and $21_2$ corresponding to multicast subcells $25_1$ and $25_2$ are connected to the transceiver 10 by transmission paths $31_1$ and $31_2$, respectively. Multicast subcells $25_1$ and $25_2$ are served by the same radio frequency. Mobile 35 is at the boundary between the multicast subcells $25_1$ and $25_2$, so that the mobile 35 is approximately equidistant from the remote antenna units $21_1$ and $21_2$. The strengths of the signals received at the remote antenna units $21_1$ and $21_2$ are therefore substantially equal if the path lines to each remote antenna unit are similarly situated. However, while mobile 35 is approximately equidistant from antenna units $21_1$ and $21_2$, transmission paths $31_1$ and $31_2$ are of different lengths, causing a differential delay time Δt between identical signals received at a transceiver. In FIG. 4(b), the differential delay time Δt is within the time window of the transceiver equalizer. In this case, the equalizer is able to compensate for this transmission delay and prevent the detrimental effects of multicast interference. However, when the differential delay time Δt is greater than the time window of the equalizer, as shown in FIG. 4(c), intersymbol interference occurs and quality is degraded. While it is possible to design an equalizer that compensates for a longer differential time delay, this approach is typically not practical.

Techniques are known for adjusting the transmission delays for transmission paths of various lengths so that the delay times for multicast cells are equalized to prevent multicast interference. Such techniques are described, for example, in U.S. application Ser. No. 08/683,382, entitled "Distributed Antenna Delay Compensation", filed on Jul. 18, 1996. According to the disclosed technique, specialized equipment can be used for detecting the delay of each separate transmission path and adjusting the delay factors so that the associated delay time is equalized. It would be desirable to reduce multicast interference in an economical and efficient manner by eliminating the need for specialized equipment and labor-intensive procedures.

SUMMARY OF THE INVENTION

A principal object of the present invention, therefore, is to provide a system and method for reducing multicast interference in a distributed antenna network.

According to one aspect of the present invention, the foregoing object and other advantages are achieved by a distributed antenna network in which one or more multicast interference zones are defined between adjacent subcells of a multicast cell. At least one new subcell served by a radio frequency different from the radio frequency which serves the multicast cell is positioned to cover each multicast interference zone. By separating adjacent subcells in the multicast cell by at least one new subcell served by a different frequency, the multicast interference zone is effectively shifted as the mobile travels between subcells, thereby reducing multicast interference. For most applications, a one subcell separation between adjacent subcells is sufficient to reduce multicast interference in order to provide acceptable quality. However, more than one subcell may be necessary to separate adjacent multicast subcells in certain circumstances.

The configuration of the present invention avoids the need for specialized equipment and circuitry for reducing multicast interference transmission problems, and reduces system cost by enabling radios to cover larger geographic areas.

BRIEF DESCRIPTION OF THE DRAWINGS

The features and advantages of the present invention will be more fully understood upon reading the following Detailed Description of the Preferred Embodiments in conjunction with the accompanying drawings, in which:

FIGS. 8(a) and 8(b) illustrate cell configurations which reduce multicast interference according to the present invention.

DETAILED DESCRIPTION OF THE PREFERRED EMBODIMENTS

Figure 1:
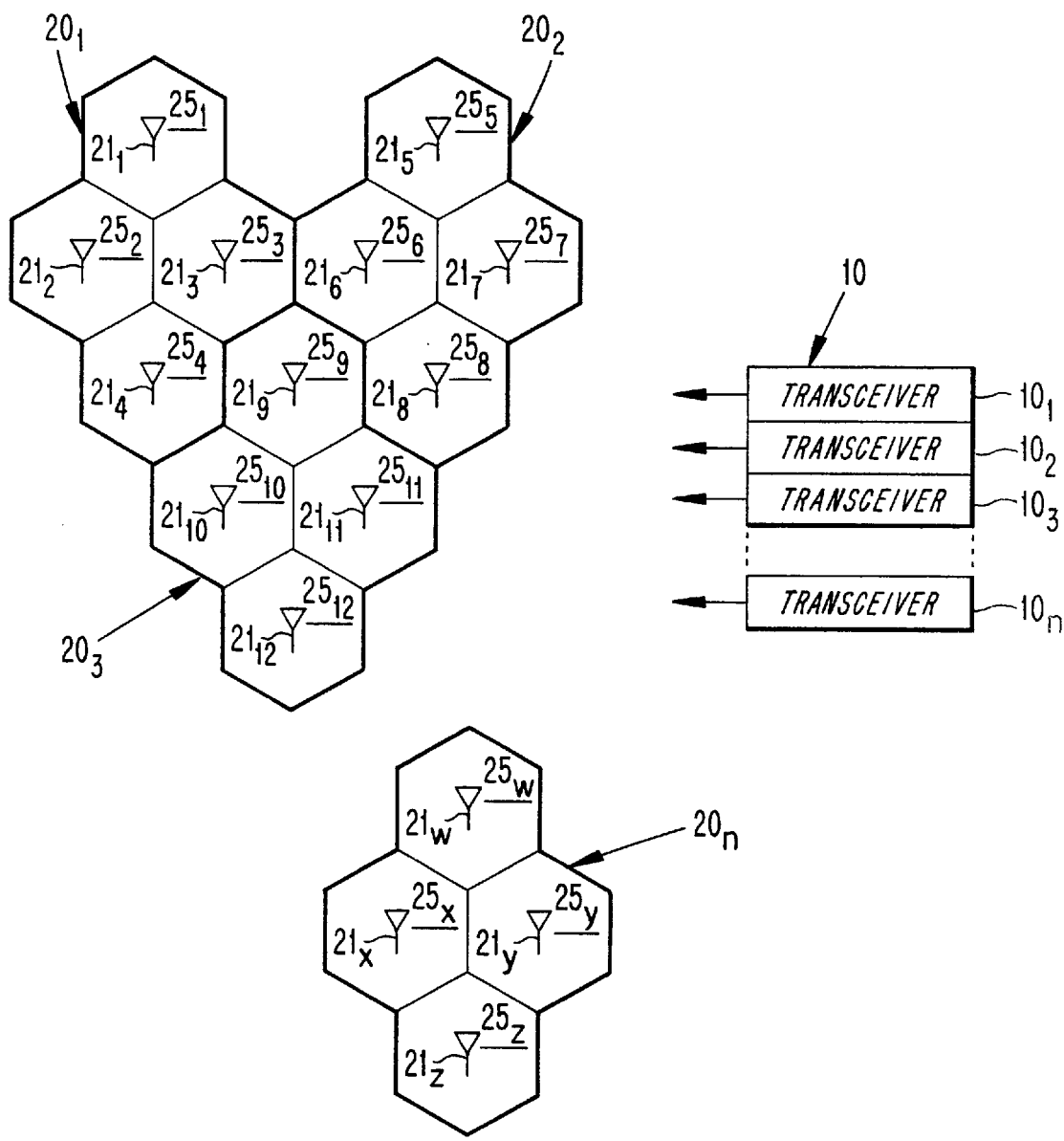
FIG. 1 illustrates a conventional multicasting distributed antenna network.
Figure 2:
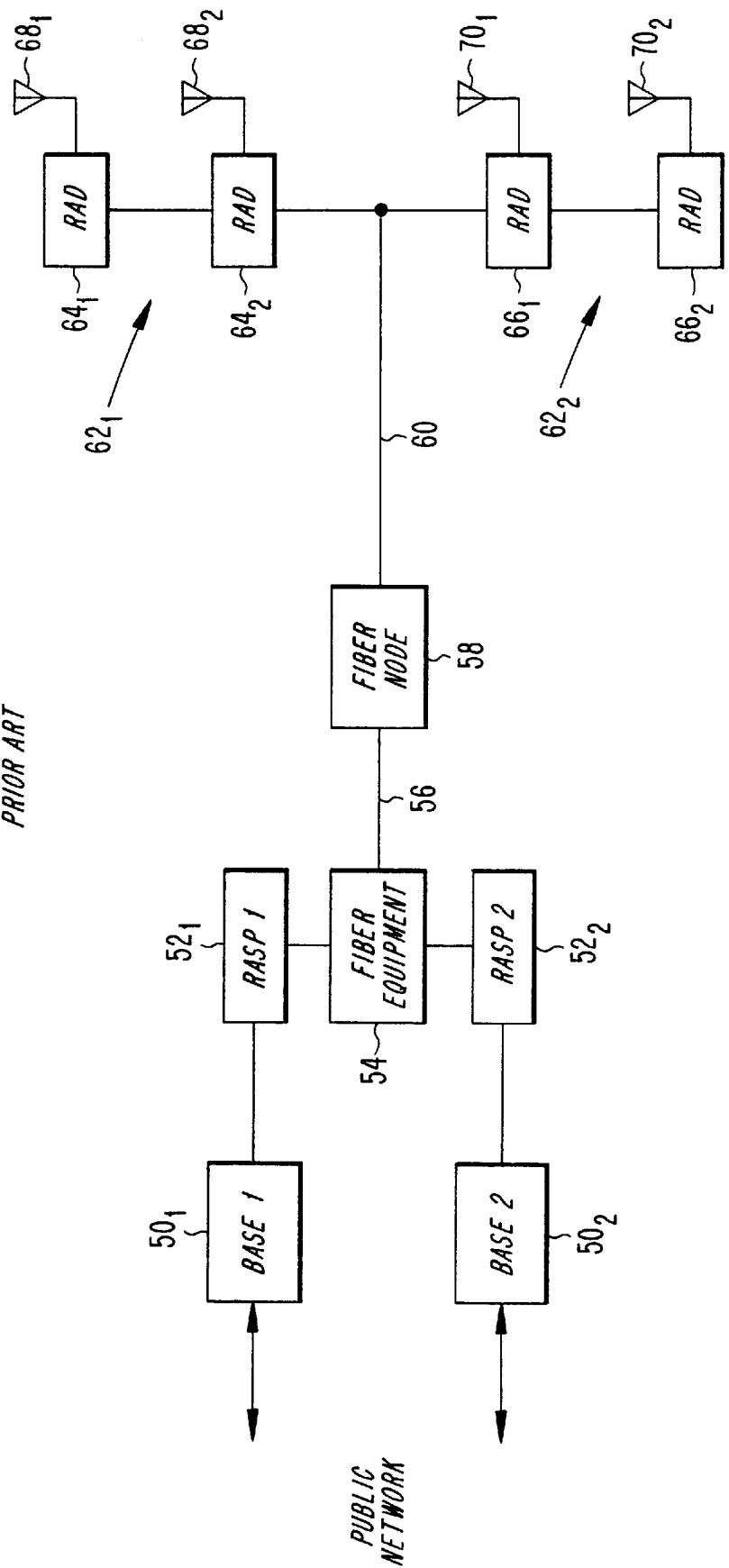
FIG. 2 is a block diagram of a known CATV infrastructure which supports wireless communications.
Figure 3:
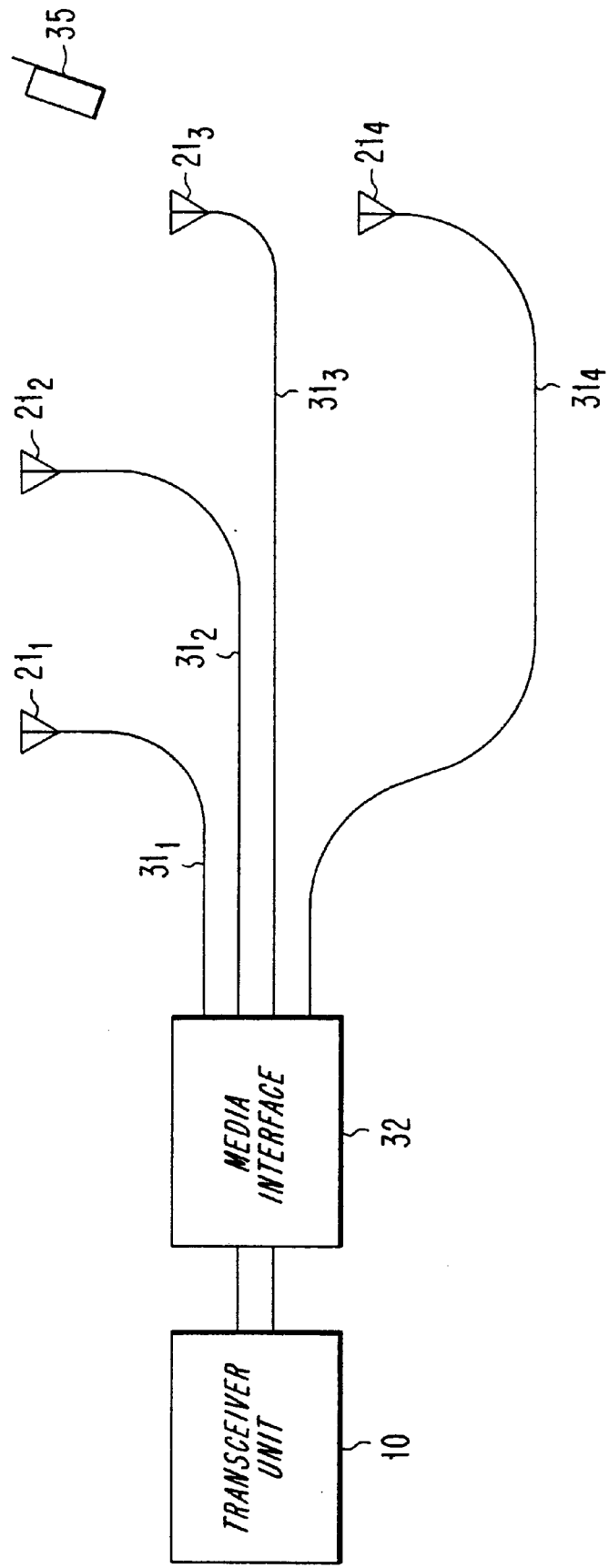
FIG. 3 illustrates multiple transmission paths in a conventional distributed antenna network.
Figure 4A:
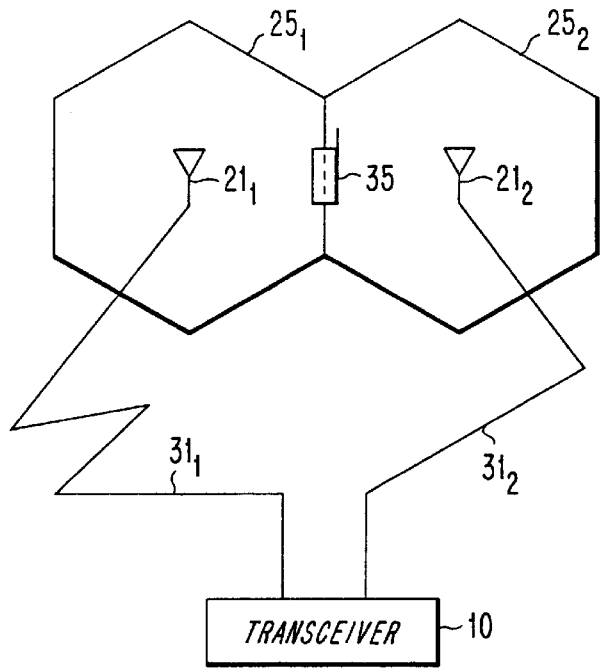
FIGS. 4(a), 4(b), and 4(c) illustrate a differential delay time condition and associated equalization timing diagrams.
Figure 4B:
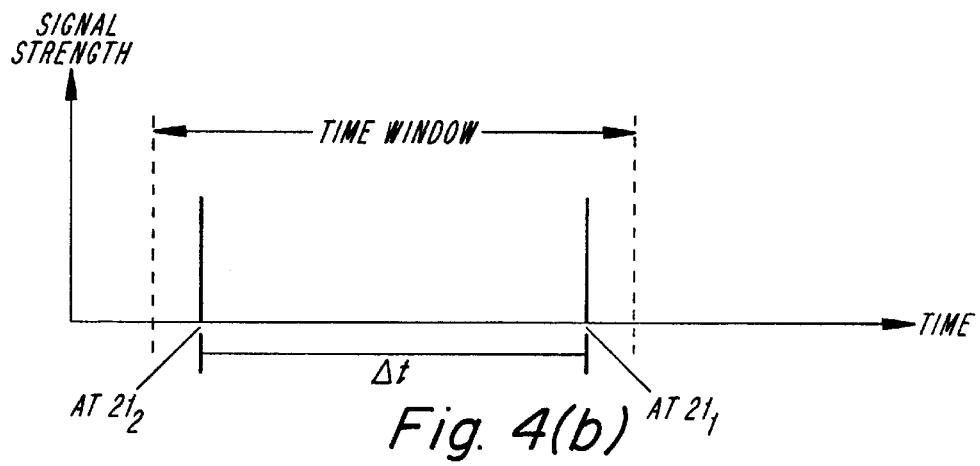
Figure 4C:
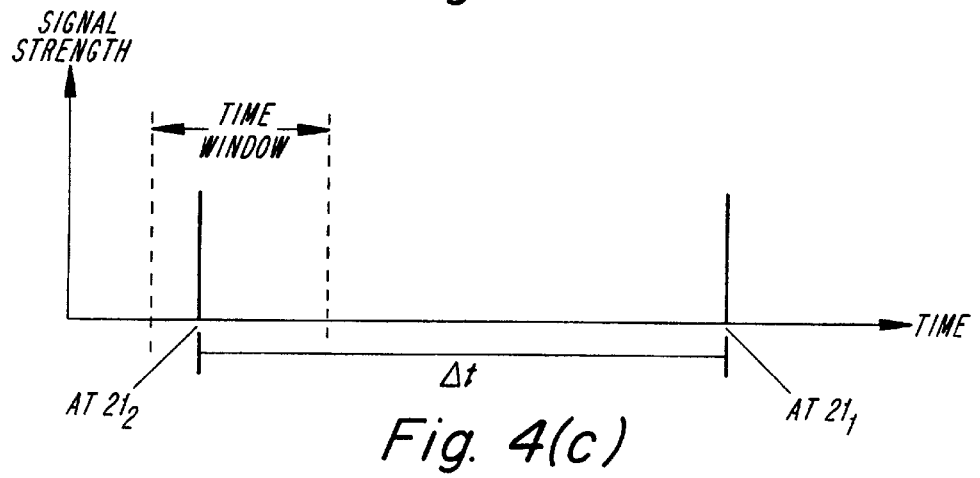
Figure 5A:
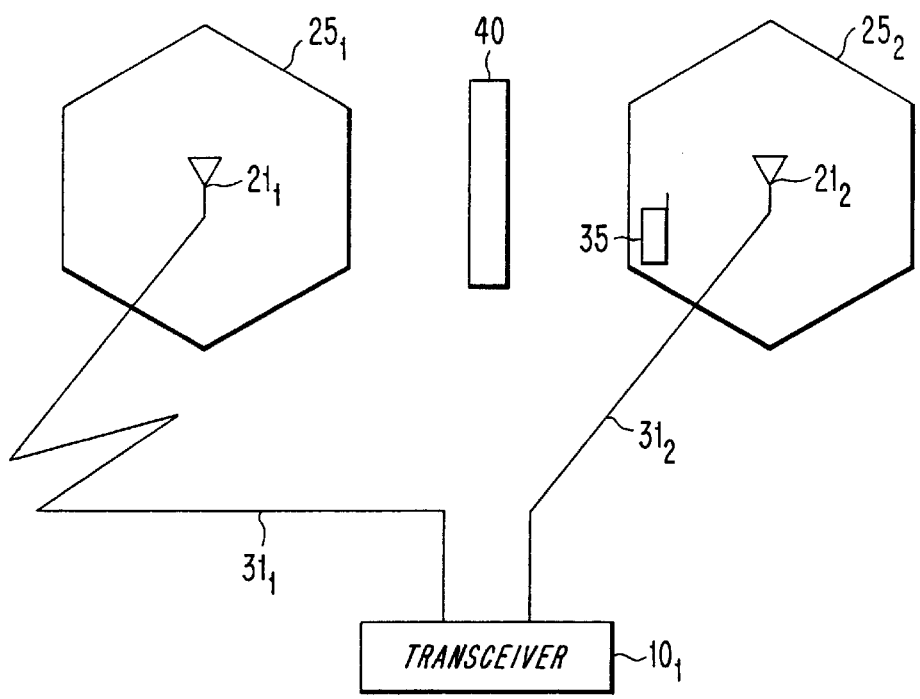
FIGS. 5(a), 5(b), and 5(c) illustrate a multicast interference zone, an equalization time diagram, and a solution according to the present invention, respectively.
Figure 5B:
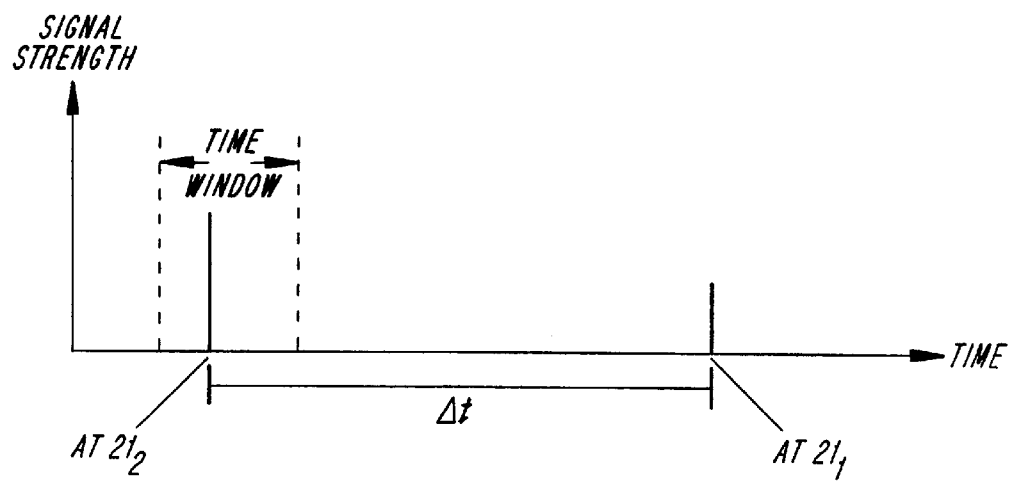
Figure 5C:
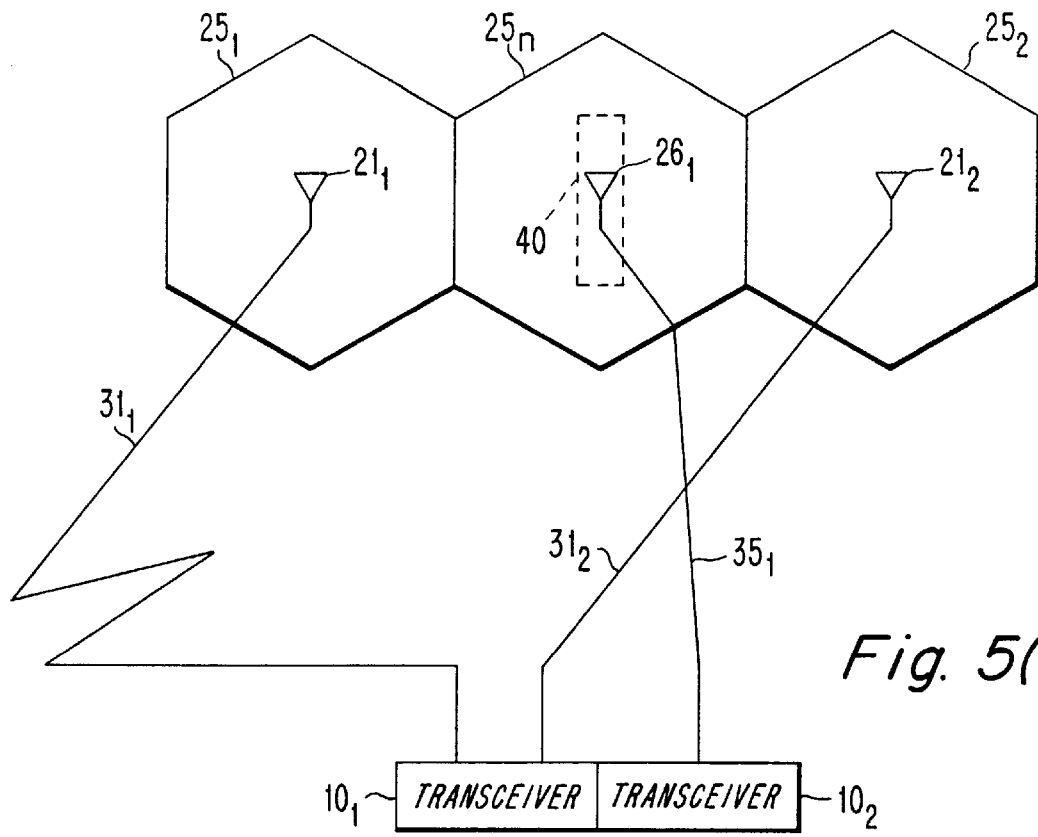

FIGS. 5(a) and 5(c) illustrate a multicast interference zone and a solution according to an embodiment of the present invention, respectively, and FIG. 5(b) is an equalization timing diagram for the condition in FIG. 5(a). In FIG. 5(a), two multicast subcells $25_1$ and $25_2$ served by remote antenna units $21_1$ and $21_2$, respectively, are connected to a transceiver $10_1$ by transmission paths $31_1$ and $31_2$. A mobile 35 is within multicast subcell $25_2$ such that the signal strength of a signal transmitted from mobile 35 is significantly greater at remote antenna unit $21_2$ than at remote antenna unit $21_1$. Furthermore, the signal is received by the transceiver $10_1$ from the remote antenna unit $21_2$ before the signal is received from the remote antenna unit $21_1$ because the length of the transmission path $31_1$ is greater than the length of the transmission paths $31_2$. This transmission time delay Δt is illustrated in FIG. 5(b).

FIG. 5(b) also illustrates an equalizing time window $t_w$ of an equalizer associated with the transceiver $10_1$. The time delay Δt is greater than the equalizing time window (Δt>$t_w$). In this case, because a relatively large amount of the signal strength energy is within the equalizing time window $t_w$ (represented by the lines corresponding to relative signal strengths for remote antenna units $21_1$ and $21_2$), the level of multicast interference is relatively low. Specific signal strength values are not shown in FIG. 5(b); rather for purposes of explanation, the relative signal strength difference is shown. In this example, the signal strength from the remote antenna unit $21_1$ is assumed to be low enough that communication quality is not adversely affected.

In the configuration of FIG. 5(a), a multicast interference zone 40 is associated with multicast subcells $25_1$ and $25_2$. This multicast interference zone 40 corresponds to an area where the effects of multicast interference are so severe that the transceiver equalizer is unable to compensate for them. In this particular example, the lengths of the transmission paths $31_1$ and $31_2$ are sufficiently different to cause the transmission time delay Δt to exceed the equalizing time window $t_w$ (Δt>$t_w$), such that multicast interference will occur in multicast interference zone 40. The time difference Δt is calculated according to the equation:

$$\Delta t = \frac{\Delta d}{V_{tp}}$$

wherein $\Delta d$ corresponds to the difference between the lengths of the two transmission paths and $V_{tp}$ corresponds to the speed at which signals travel over the transmission medium. The signal speed $V_{tp}$ depends upon the particular transmission medium used for the transmission paths. For example, when coaxial cable is used, the speed will be approximately 80–90% of the speed of light, and when fiber optic cable is used, the speed will be approximately 60–70% the speed of light. Similarly, the equalizing time window depends upon the system standard. For instance, in GSM, the equalizing time window is approximately 16 microseconds and in D-AMPs, the equalizing time window is approximately 40 microseconds. Although specialized equalizers can be designed to have a wider equalizing time window for specific applications, the present invention avoids the use of such specialized equalizers, and the increased time and cost associated with their implementation.

A multicast interference zone can be characterized as follows. First, a line can be determined by points where the signal strengths of signals received at two receiving sites from a mobile are approximately equal; that is, where the mobile is approximately equidistant from the time receiving sites. This line represents the points where multicast interference is the most severe. The multicast interference zone can be determined by points where $\Delta t$ falls within the equalizing time window. Alternatively, the width of this multicast interference zone with respect to the equal signal strength line can be calculated based on the equation $s=p-20\log(d)$, where s is a desired signal strength for a receiving site, d is the distance from the mobile station to the receiving site, and p is the output power of the mobile. It will be appreciated that this equation assumes an ideal path loss, and can be modified if the transmission conditions vary.

Figure 6:
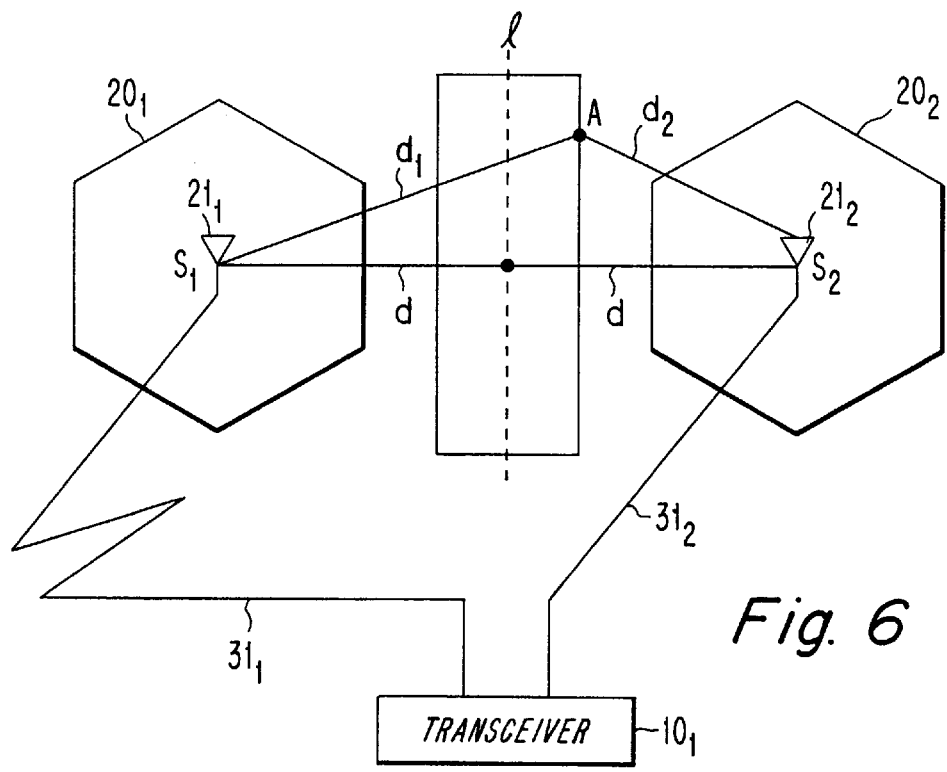
FIG. 6 illustrates an exemplary calculation of a multicast interference zone according to an embodiment of the present invention.

Referring now to FIG. 6, an exemplary calculation for a multicast interference zone 40 will be described. In this example, it is assumed that the lengths of the transmission paths $31_1$ and $31_2$ are substantially different, and that significant multicast interference occurs ($\Delta t > t_w$). Using the above-described calculation method, a line 1 of points approximately equidistant (at a distance d) from remote antenna units $21_1$ and $21_2$ is determined. Next, a point A at one edge of the multicast interference zone 40 is determined, where a desired percentage of total signal strength is reached. Point A is a distance $d_1$ from antenna $21_1$ and a distance $d_2$ from antenna $21_2$. To calculate this point for a desired signal strength difference of, for example, 10 dB, the following equation can be used: $10 \text{ db} = S_2 - S_1 = (p - 20 \log d_2) - (p - 20 \log d_1)$, where p is the mobile output power and $d_1$ and $d_2$ are the distances between points A and the antenna sites $21_1$ and $21_2$, respectively. From the equation, the ratio $d_1/d_2 = 3.162$ can be determined, and $d_1$ and $d_2$ can be calculated using known mathematical relationships. These ratios are then used to determine all points A which define the multicast interference zone 40.

According to the invention, once the multicast interference zone 40 is calculated, one or more subcells belonging to a different multicast cell are positioned to encompass the multicast interference zone 40. As a result, a mobile travelling in the multicast interference zone 40 between multicast subcells $25_1$ and $25_2$ will be handed off to at least one new controlling multicast subcell, which belongs to a different multicast cell than subcells $25_1$ and $25_2$, thus avoiding the multicast interference which would otherwise occur in multicast interference zone 40.

FIG. 5(c) illustrates an example of a configuration according to the present invention where a subcell $25_n$ encompasses a multicast interference zone 40 for the multicast subcells $25_1$ and $25_2$. Although a configuration according to the present invention significantly reduces multicast interference when a single coverage area is used to encompass the multicast interference zone 40, it will be appreciated that additional coverage areas may be used to encompass the multicast interference zone 40 to further reduce the effects of multicast interference. The transceiver $10_2$ is connected to remote antenna unit $26_1$ by transmission media $35_1$. In this example, the mobile travels to the new controlling multicast subcell $25_n$ (belonging to a different multicast cell) before reaching the multicast interference zone 40. As a result, the multicast interference zone 40 for multicast subcells $25_1$ and $25_2$ is effectively avoided.

Figure 7A:
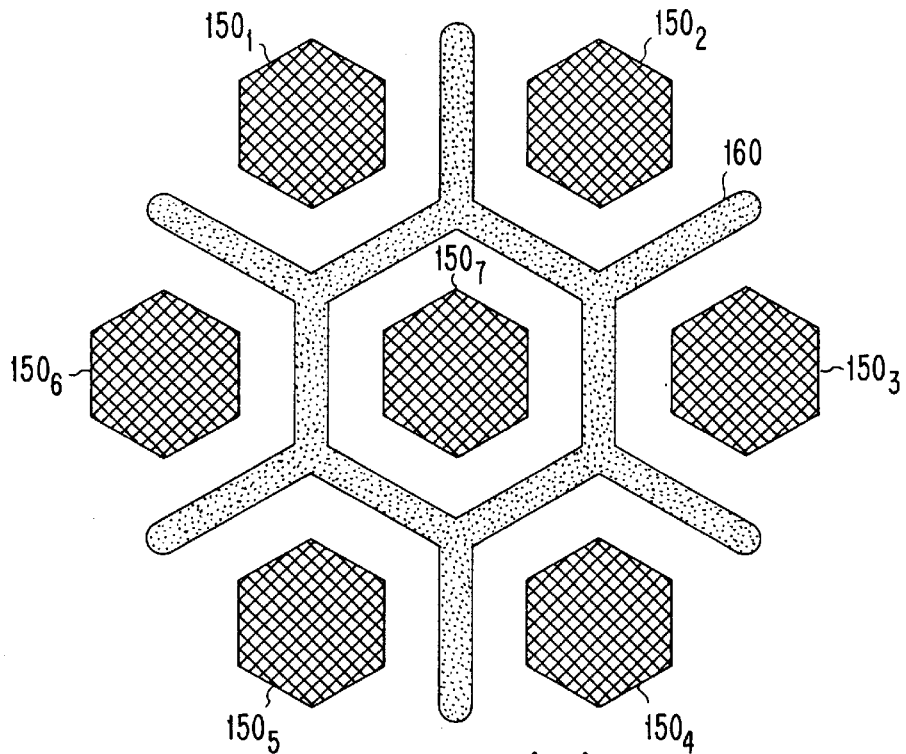
FIGS. 7(a), 7(b) illustrate multicast interference zones.
Figure 7B:
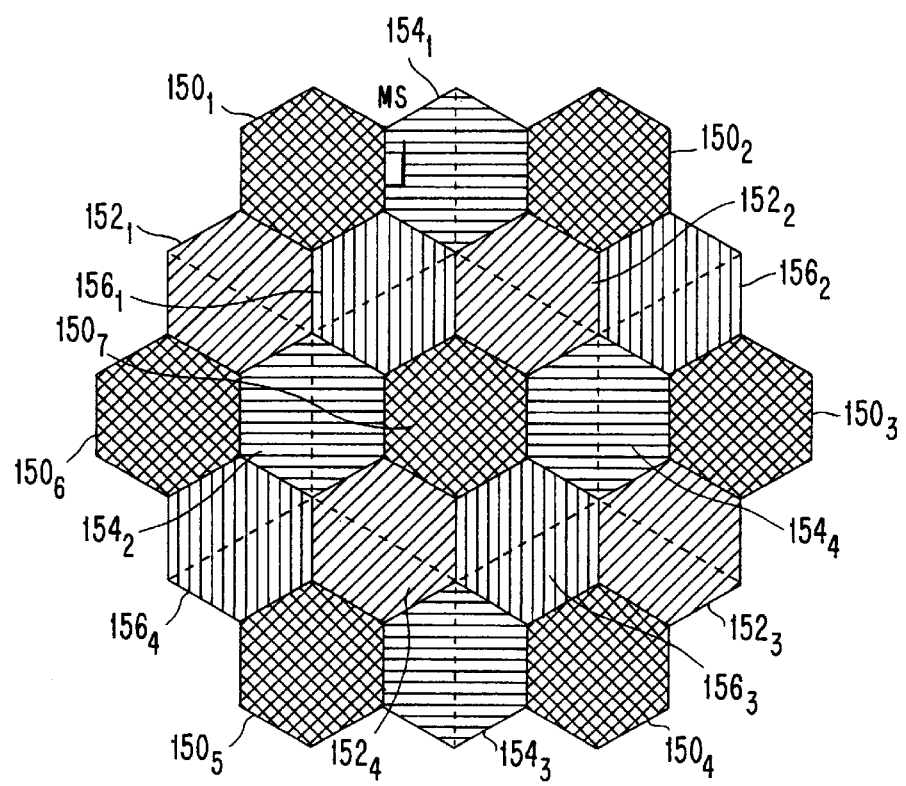

FIG. 7(a) illustrates an example of a multicast interference zone 160 for a plurality of multicast cells $150_1$ through $150_7$. FIG. 7(b) illustrates a first group of multicast cells $152_1$ through $152_4$ tuned to a first frequency which is a different frequency than that associated with multicast cells $150_1$–$150_7$, a second group of multicast cells $154_1$ through $154_4$ tuned to a second frequency, and a third group of multicast cells $156_1$ through $156_4$ tuned to a third frequency. In this example, the first, second, and third groups encompass the entirety of multicast interference zone 160. This configuration is desirable because relatively few radio transceivers are used to encompass the multicast interference zone 160.

Figure 8A:
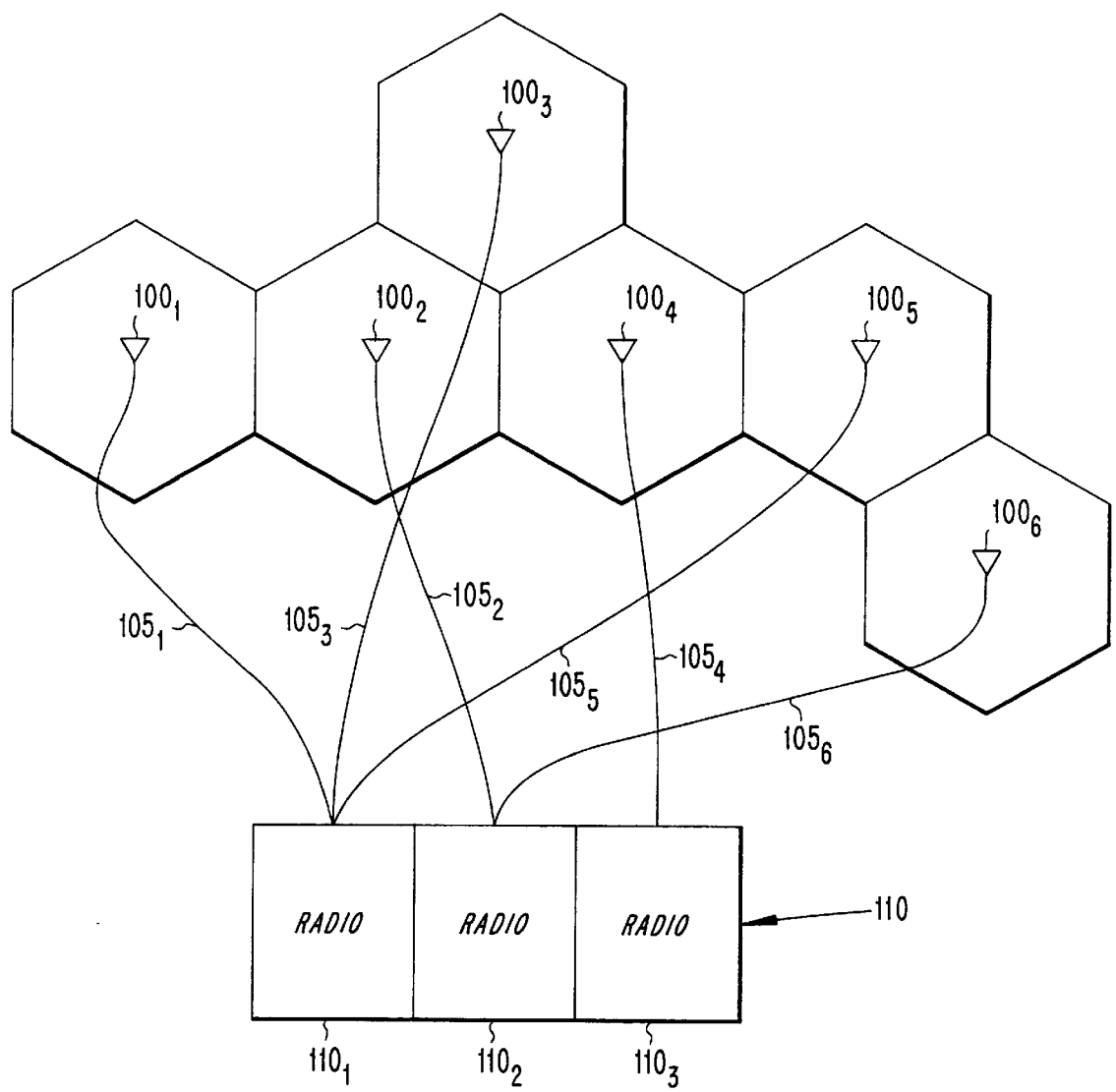

FIG. 8(a) illustrates a configuration of connections between a centralized radio resource and remote antenna units according to one embodiment of the present invention. Remote antenna units $100_1$, $100_2$, $100_3$, $100_4$, $100_5$, and $100_6$ are connected to a centralized radio resource 110. The centralized radio resource includes radios $110_1$, $110_2$, $110_3$, each of which operates at a different frequency. The remote antenna units $100_1$–$100_6$ are connected to the radio $110_1$, $110_2$, and $110_3$ by transmission media $105_1$, $105_2$, $105_3$, $105_4$, $105_5$ and $105_6$. The centralized radio resource 110 can be located, for example, at a CATV station or headend. In the configuration of FIG. 8(a), three radios are the minimum number required to ensure that physically adjacent or adjoining remote antenna units are not tuned to the same radio frequency. In FIG. 8(a), remote antenna units $100_1$, $100_3$, and $100_5$ are tuned to a first radio frequency and serve multicast cells $120_1$, $120_3$, and $120_5$, remote antenna units $100_2$ and $100_6$ are tuned to a second radio frequency and serve multicast cells $120_2$, and $120_6$, while remote antenna unit $100_4$ is tuned to a third radio frequency and serves a coverage area $120_4$. This configuration realizes the benefits of multicasting while reducing multicast interference.

FIG. 8(b) illustrates a 7 cell reuse plan implemented with a minimum number of distinct radios in a configuration according to the present invention. In a conventional system, 42 different radios would be required to provide comparable coverage. This would offer too much capacity and would be too costly for an initial deployment. In configuring the system to prevent multicast interference according to the present invention, the same coverage can be provided using only seven radios, where each radio serves six multicast cells. By using this configuration, complex equalization techniques are not necessary because adjacent multicast cells are sufficiently separated by subcells belonging to different multicast cells tuned to different radio frequencies.

The foregoing description includes many details and specificities. These details and specificities are provided for purposes of explanation, and do not define or limit the invention. Many modifications to the described embodiments will be readily apparent to those of ordinary skill in the art which are within the scope of the invention, as defined by the following claims and their legal equivalents.

What is claimed is:

1. A distributed antenna network, comprising:

a plurality of radio transceivers, each transceiver serving a separate one of a plurality of multicast cells; and a plurality of remote antenna units connected to each of said transceivers, each remote antenna unit being positioned to provide coverage for a separate subcell of the multicast cell served by the transceiver to which the remote antenna unit is connected, wherein, within each multicast cell, outgoing information signals are transmitted from the transceiver serving the multicast cell via all of the remote antenna units in the multicast cell, and incoming information signals are received at the transceiver serving the multicast cell via all of the remote antenna units in the multicast cell, and wherein a multicast interference zone between two subcells in a first multicast cell is covered by a remote antenna unit in a second multicast cell, the multicast interference zone being defined as a region in which delays between identical signals passing through the remote antenna units of the two subcells of the first multicast cell disrupt communications of the transceiver serving the first multicast cell, the delays between signals resulting from the remote antenna units of the two subcells being connected to the transceiver serving the first multicast cell by transmission media having different lengths.

2. A method for reducing multicast interference in a distributed antenna network, comprising the steps of:

providing a plurality of first remote antenna units, each first remote antenna unit being coupled to a common radio unit and providing coverage for a multicast subcell within a first multicast cell served by the common radio unit, wherein outgoing signals are transmitted from the common radio unit via all of the first remote antenna units and incoming signals are received at the common radio unit via all of the first remote antenna units;

defining one or more multicast interference zones between the first remote antenna units, each multicast interference zone being a region in which delays between identical signals passing through at least two of the first remote antenna units disrupt communications of the common radio unit, the delays between signals resulting from the at least two first remote antenna units being connected to the common radio unit by transmission media having different lengths; and providing one or more second remote antenna units to provide coverage for the multicast interference zones, each second remote antenna unit being coupled to a radio unit different than the common radio unit and providing coverage for a multicast subcell within a second multicast cell served by the different radio unit.

3. The method of claim 2, wherein the step of defining one or more multicast interference zones includes the steps of:

defining a maximum time differential between arrival times, at the common radio unit, of identical signals received at two or more of the first remote antenna units; and determining points where the time differential between arrival times exceeds the maximum time differential.

4. The method of claim 3, wherein the maximum time differential is a time window within which an equalizer in the common radio unit can compensate for identical signals being received at different times.

5. The method of claim 2, wherein the step of defining one or more multicast interference zones is performed using the equation $s=p-20\log(d)$, where s is a desired signal strength level, p is the output power of a mobile station communicating with the network, and d is the distance between the mobile station and one of the first remote antenna units.

6. The method of claim 2, further comprising the step of handing off a mobile station, traveling into a multicast interference zone, from one of the first remote antenna units to one of the second remote antenna units.

7. The distributed antenna network of claim 1, wherein a multicast interference zone is defined by points in a coverage area of the distributed antenna network where transmission of a signal from a mobile station results in two or more versions of the signal being received at one of said transceivers, via two or more remote antenna units connected to said one transceiver, and separated in time by an amount which exceeds a maximum allowable time differential for said one transceiver.

8. The distributed antenna network of claim 7, wherein the maximum allowable time differential for said one transceiver is a time window within which an equalizer in said one transceiver can compensate for receiving multiple versions of a signal at different times.

9. The distributed antenna network of claim 1, wherein a multicast interference zone is defined using the equation $s=p-20\log(d)$, where s is a desired signal strength level, p is the output power of a mobile station communicating with the network, and d is the distance between the mobile station and one of the remote antenna units.

10. The distributed antenna network of claim 1, wherein a mobile station traveling into a multicast interference zone of one multicast cell is handed off to another multicast cell.

* * * * *